UNITED STATES PATENT OFFICE.

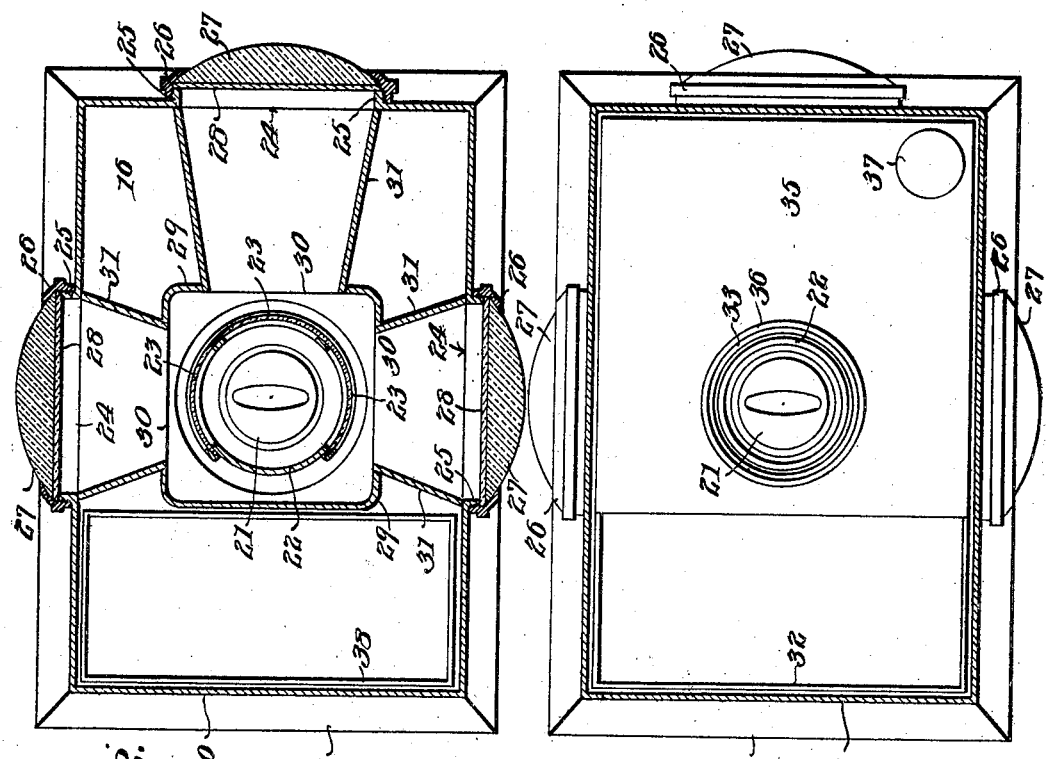

THOMAS D. COMER, OF NORTON, VIRGINIA, ASSIGNOR OF ONE-HALF TO WILLIAM A. CARDIN, OF NORTON, VIRGINIA.

LUNCH-PAIL AND LANTERN.

No. 820,390.  Specification of Letters Patent.  Patented May 15, 1906.

Application filed June 22, 1905. Serial No. 266,481.

*To all whom it may concern:*

Be it known that I, THOMAS D. COMER, a citizen of the United States, residing at Norton, in the county of Wise and State of Virginia, have invented a new and useful Lunch-Pail and Lantern, of which the following is a specification.

This invention relates to combined lunch-receptacles and lanterns, and has for its object to improve the construction and increase the efficiency and utility of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a longitudinal sectional elevation. Fig. 2 is a transverse section on the line 2 2 of Fig. 1. Fig. 3 is a transverse section on the line 3 3 of Fig. 1.

The improved device comprises a casing 10 of any approved size or form and of any suitable material, but preferably oblong in transverse section and elevation and with a cover 11, hinged at 12 and provided with means, such as a hasp or keeper 13 and staple 14, for securing in closed position. The material employed will preferably be tinned copper; but other material may be employed, if required. At the lower end the casing is provided with an outwardly-inclined depending flange 15, which thus supports the bottom 16 of the casing spaced above the floor upon which the device rests. The bottom 16 is provided with a central aperture surrounded by a depending flange or rim 17, over which a flange 18 on a lamp-body 19 bears and secured thereto, as by pins 20, in any of the usual methods for securing lamps in lantern-casings. The burner 21 of the lamp is provided with a chimney 22, which is preferably of metal, with transparent portions 23 opposite the flame of the burner, as shown. The transparent members of the chimney will preferably be mica or similar non-fragile material.

Disposed through one or more of the walls of the casing in transverse alinement with the flame of the burner are apertures 24, having threaded rims 25 exteriorly of the casing for receiving threaded clamp-rings 26 for supporting transparent "bull's-eyes" 27 in position over the apertures, the bull's-eyes having glass plates 28 between them and the flanges or rims 25. The members 28 may be of any desired color, and by providing a plurality of the apertures and their associated bull's-eyes and a corresponding number of glass members 28 of different colors any required color may be presented to the observer, as hereinafter explained.

Rising from the bottom 16 of the casing is a tubular member 29, forming an internal casing for the upper portion of the lamp, including its burner 21, and a portion of the chimney 22, including the transparent members 23. The tubular member 29 is provided with apertures 30, corresponding in number to the apertures 24 and in alinement with the same, and also with the transparent members 23 and burners 21, but smaller than the apertures 24. Extending between the apertures 24 and 30 are tubular members 31, having their walls diverging outwardly and forming reflectors of the ordinary form between the lamp-flame and the bull's-eyes 27, as will be obvious. The light radiating from the lamp-flame is thus diffused and the area of its influence increased, while at the same time intensified for more effective use.

Any number of the bull's-eyes and reflector may be arranged in the device; but generally three will be employed, as shown, so that a green-glass member 28 may be inserted in the rear of one of the bull's-eyes, a red glass in the rear of another bull's-eye, and an ordinary white glass in the rear of another of the bull's-eyes or one of the bull's-eyes left without any glass behind it.

In signaling operations red, green, and white lights are usually employed, so that for ordinary purposes three of the bull's-eyes will be sufficient, arranged as described; but the invention is not necessarily limited thereto, as any desired number may be employed.

The portion of the casing above the internal casing 29 is utilized for supporting various receptacles for food, either liquid or solid, a receptacle 32 resting upon the upper end of the internal casing 29 and provided with a tubular member 33 for bearing over the chimney 22 of the lamp and provided with transverse apertures 34 to permit the heat from the lamp to pass to the contents of the receptacle. Another receptacle 35 bears upon the upper rim of the receptacle 32 and extends partly over the same and is also provided with a tubular member 36, through which the lamp-chimney member 22 extends, as shown. The receptacle 35 is preferably closed except for a screw-cap-covered aperture, as at 37, and is designed for holding coffee or other liquid food and extending only part way over the receptacle 32, so that access may be had to the latter when the cover 11 is opened and without disturbing the member 35. Another receptacle 38 is disposed within the space not occupied by the reflector members 31 and resting upon the bottom 16 of the casing.

The cover member 11 is provided with a plurality of vents 39 and is also provided with a larger central aperture surrounded by a depending flange 40, internally threaded and into which a tubular externally-threaded member 41 operates, the member 41 closed at the upper end, as at 42, and provided with a plurality of transverse apertures 43. By this arrangement means are provided for the escape of the surplus hot air and gases and to provide the necessary ventilation, and by adjusting the cap member higher or lower the amount of the ventilation may be controlled by exposing a larger or smaller area of the apertures 43.

One or more of the bull's-eyes may be increased in power to increase the intensity of the light and to throw the rays passing therethrough to a greater distance. Any size of lamp or a lamp capable of imparting any required intensity of light may be employed.

Having thus described the invention, what is claimed is—

1. In a device of the class described, an inclosing casing having a tubular member rising from its bottom, and with transversely-disposed light-apertures in the casing and tubular member, reflector members having walls diverging outwardly and extending between the tubular-member apertures and the casing-apertures, a lamp disposed in said tubular member with its flame in alinement with said apertures, and a receptacle supported upon said tubular member and provided with a central tubular shell above said tubular member for permitting the passage of the heat from the lamp.

2. In a combined lantern and lunch-receptacle, an inclosing casing having an air-outlet in its upper part and light-apertures in the lower part, a tubular member within said receptacle and provided with light-apertures opposite the light-apertures in said casing, a lamp within said tubular member with its flame opposite said light-apertures, a receptacle supported upon said tubular member and provided with a central tubular shell above said tubular member, and means for increasing or decreasing the area of said air-outlet to correspondingly increase or decrease the flame of said lamp.

3. In a device of the class described, an inclosing casing having a tubular member rising from its bottom, a lamp disposed within said tubular member, a lower receptacle supported upon said tubular member and provided with a central tubular shell extending above said lower receptacle, an upper receptacle supported upon said lower receptacle and provided with a tubular shell engaging the extended portions of the tubular shell of the lower receptacle.

4. In a device of the class described, an inclosing casing having a tubular member rising from its bottom, a lamp disposed within said tubular member, and a receptacle supported upon said tubular member and provided with a central tubular shell above said tubular member, and a chimney to said lamp and extending through the shell.

5. In a device of the class described, an inclosing casing having a tubular member rising from its bottom, and with an air-outlet aperture in its upper part, a lamp disposed within said tubular member, a receptacle supported upon said tubular member and with a central tubular shell corresponding to said tubular member, and a sleeve having spaced transverse apertures and adjustable vertically through said air-outlet for increasing or decreasing the area of the exposed portions of said apertures, to correspondingly increase or decrease the air-discharge.

6. In a device of the class described, an inclosing casing having a tubular member rising from its bottom, and with an air-outlet aperture in its upper part, a lamp disposed within said tubular member, a receptacle supported upon said tubular member and with a central tubular shell corresponding to said tubular member, a chimney upon said lamp and extending through said shell and spaced from the same, and a sleeve having spaced transverse apertures and adjustable vertically through said air-outlet for increasing or decreasing the area of the exposed portions of said apertures, to correspondingly increase or decrease the air-discharge.

7. In a device of the class described, an inclosing casing having a tubular member rising from its bottom, and with a threaded air-outlet in the upper part, a lamp disposed within said tubular member, a receptacle supported upon said tubular members and with a central tubular shell corresponding to said tubular member, and a threaded sleeve having spaced transverse apertures and engaging said threaded aperture.

8. In a device of the class described, an inclosing casing having a tubular member rising from its bottom, a lamp disposed within said tubular member, a lower receptacle supported upon said tubular member and provided with a central tubular shell in alinement with said tubular member and extending above said lower receptacle, an upper receptacle of less length than said lower receptacle and bearing upon the same at one side, said upper receptacle having a tubular shell at one side bearing over the extending portion of the tubular shell of said lower receptacle.

In testimony that I claim the foregoing as my own I have hereto affixed my signature in the presence of two witnesses.

THOMAS D. COMER.

Witnesses:
 J. B. FLEMING,
 A. S. HIGGINBOTHAM.